US009466006B2

(12) United States Patent
Duan

(10) Patent No.: US 9,466,006 B2
(45) Date of Patent: Oct. 11, 2016

(54) METHOD FOR DETECTING VISUAL SALIENCIES OF VIDEO IMAGE BASED ON SPATIAL AND TEMPORAL FEATURES

(71) Applicant: Beijing University of Technology, Beijing (CN)

(72) Inventor: Lijuan Duan, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 50 days.

(21) Appl. No.: 14/601,254

(22) Filed: Jan. 21, 2015

(65) Prior Publication Data
US 2016/0210528 A1 Jul. 21, 2016

(30) Foreign Application Priority Data
Feb. 24, 2014 (CN) .......................... 2014 1 0061301

(51) Int. Cl.
G06K 9/48 (2006.01)
G06K 9/46 (2006.01)
G06K 9/52 (2006.01)
G06K 9/00 (2006.01)
(52) U.S. Cl.
CPC ......... G06K 9/4671 (2013.01); G06K 9/00711 (2013.01); G06K 9/4652 (2013.01); G06K 9/52 (2013.01)
(58) Field of Classification Search
None
See application file for complete search history.

(56) References Cited

U.S. PATENT DOCUMENTS

| 2008/0304708 | A1* | 12/2008 | Le Meur | G06K 9/4623 382/107 |
| 2011/0229025 | A1* | 9/2011 | Zhao | G06K 9/4671 382/165 |
| 2013/0050574 | A1* | 2/2013 | Lu | G06K 9/4671 348/441 |
| 2013/0094587 | A1* | 4/2013 | Urban | H04N 19/85 375/240.16 |
| 2015/0286874 | A1* | 10/2015 | Burghouts | G06K 9/4676 382/103 |

* cited by examiner

Primary Examiner — David F Dunphy
(74) Attorney, Agent, or Firm — Platinum Intellectual Property LLP

(57) ABSTRACT

The present invention relates to a method for detecting visual saliencies of a video image based on spatial and temporal features, including: dividing an input image into image blocks and vectorizing the image blocks; decreasing dimensions of each image block through principal component analysis; calculating a dissimilarity between each image block and each of the other image blocks; calculating a visual saliency of each image block by combining a distance between image blocks, to obtain a spatial feature saliency map; imposing a central bias on the spatial feature saliency map; calculating a motion vector of each image block, extracting a temporal visual saliency of the current image by combining motion vectors of previous two frames, to obtain a temporal feature saliency map; integrating the spatial feature saliency map and the temporal feature saliency map to obtain a spatiotemporal feature saliency map, and smoothing the spatiotemporal feature saliency map to obtain a resulted image finally reflecting a saliency of each region on the current image. In the present invention, a saliency map integrating the temporal features and the spatial features, so that saliencies in different regions in a video may be predicted more accurately.

11 Claims, 2 Drawing Sheets (a) (b)

METHOD FOR DETECTING VISUAL SALIENCIES OF VIDEO IMAGE BASED ON SPATIAL AND TEMPORAL FEATURES

CROSS-REFERENCE TO RELATED APPLICATION

This application claims the priority benefit of Chinese patent application No. 201410061301.5, filed Feb. 24, 2014. The entirety of the above-mentioned patent application is hereby incorporated by reference herein and made a part of specification.

TECHNICAL FIELD

The present invention relates to the field of partial region analysis in video image processing, and more particularly, to a method for detecting visual saliencies of a video image based on spatial and temporal features.

BACKGROUND

Computing power of modern high-speed computers has reached an impressive level, however, computer vision systems can't perform visual tasks which are extremely simple for human, such as guiding road crossing. This is mainly because when facing a flood of visual information input, human eyes can selectively focus on significantly changed regions in the visual scene in a short time and then analyze them to adapt to environmental changes. While the computer vision systems will indiscriminately treat all regions of the visual scene, so it can't understand changes of the scene and may cause a computing bottleneck. If the selective attention function of the human visual system is introduced into the computer vision systems, it is bound to enhance the existing efficiency of computers in analyzing images.

Detection of a visual salient region of a video has a wide range of applications, for example, in video compression. When a video needs to be compressed, it is always desired that meaningful contents in the video are compressed with a relatively low compression ratio, and background regions that are not so important are compressed with a relatively high compression ratio. If this may be achieved by a device automatically, a visual saliency of each region in each frame of the video needs to be firstly determined, to identify meaningful contents in the video.

In literatures regarding detection of a visual saliency, a visually salient region is generally defined as a partial image block which has a global conspicuity in a frame of an image or a video. A common implementation of this definition is: dividing a frame of an image or a video into a plurality of image blocks; then calculating a dissimilarity of each image block with respect to each of the other image blocks; finally, each of the image blocks that has a relatively high dissimilarity is considered as a relatively salient region. Wherein, a method for determining dissimilarity may be comparing contrasts in features such as color, orientation, texture, movement and the like, of two image blocks. Another definition is that a region that has a large contrast with an adjacent region is a relatively salient region. A main difference between implementation of this definition and that of the above definition based on a global conspicuity lies in that, dissimilarity between each image block and its surrounding image blocks, rather than dissimilarity between each image block and all the image blocks in the current image, is determined.

Generally, in the above two methods, what is mainly considered is dissimilarity between image blocks. However, in fact, distances between image blocks also directly relates to visual saliencies. Relevant studies on human perception tissues show that, salient regions in an image will appear in the image in a relatively compact manner. That is, in the image, if a partial image block is similar to image blocks within a short distance to it, the image block is probably salient. If a distance between two image blocks is relatively large, one of them will contribute less to a saliency of the other even though they are similar to each other. Therefore, in an image, contribution of one image block to a saliency of another image block increases as dissimilarity between them increases, and decreases as a distance between them increases.

Moreover, relevant studies on human visual systems show that, in observation of a visual scene, human eyes have a characteristic of central bias. Statistics on distribution of fixations of human eyes in observing a large number of images recorded by a gaze tracker also show that, although for a few images, fringe regions of an image may have relatively salient contents, while in general, an average attention degree of a human eye to a region of an image decreases with a distance between the region and a center region of the image increases.

Patent Application No. 201010522415.7 discloses a method for detecting visual saliencies of different regions in an image, in which a saliency of each image block is measured in features of appearance, position and distance to the center. However, the detection method only considers differences in spatial features between two image blocks, and ignores differences in motion features between them. In fact, when a person watches a video, motion features are key factors to appeal human eyes and a human visual system allocates many resources on motion perception. Moreover, human eyes are capable of keeping track of a target object. Therefore, differences in motion features should be considered in measurement of saliencies of image blocks in a video.

SUMMARY

To solve the above problem, the present invention provides a method for detecting visual saliencies of different regions of an image based on differences in motion feature, in which, based on an acquired spatial feature saliency map, temporal visual saliencies are obtained by extracting motion features between image blocks, to further constitute a temporal feature saliency map, and a spatiotemporal feature saliency map is obtained by integrating the spatial feature saliency map and the temporal feature saliency map, so saliencies in different regions of the video may be predicted more accurately.

One object of the present invention is to provide a method for detecting visual saliencies of a video image based on spatial and temporal features, including the following steps:

1) selecting a current image from a video, dividing the current image into L non-overlapping square image blocks, each of the image blocks containing $K^2$ pixels;

2) vectorizing each pixel in each of the image blocks into a column vector, each value in the column vectors being a R value, a G value and a B value of a RGB value of the pixel such that the column vector has a length of $3K^2$ values;

3) jointing column vectors of all image blocks in a row direction, to form a value matrix of the current image which has $3K^2$ rows and L columns;

4) performing a dimension decreasing operation on the value matrix of the current image by utilizing a principal component analysis algorithm;

5) calculating a spatial visual saliency of each image block in the current image with decreased dimensions, adding the spatial visual saliency to a position corresponding a position of the image block in the current image, to constitute a two-dimension spatial feature saliency map of the current image;

6) calculating a temporal saliency of each image block in the current image with decreased dimensions according to a block matching method, adding the temporal visual saliency to a position corresponding a position of the image block in the current image, to constitute a two-dimension temporal feature saliency map of the current image; and 7) integrating the two-dimension spatial feature saliency map and the two-dimension temporal feature saliency map, to obtain a spatiotemporal feature saliency map.

Preferably, in the method for detecting visual saliencies of a video image based on spatial and temporal features, the step 7) further includes: performing a smoothing operation on the spatiotemporal feature saliency map through a two-dimension Gaussian smoothing operator, to obtain a resulted image finally reflecting a saliency of each region on the current image.

Preferably, in the method for detecting visual saliencies of a video image based on spatial and temporal features, a plurality of frames of images of the video is acquired at equal time intervals, and the current image is one of the frames of images.

Preferably, in the method for detecting visual saliencies of a video image based on spatial and temporal features, in the step 6), calculating a temporal saliency of each image block in the current image with decreased dimensions according to a block matching method includes: firstly, calculating a motion vector of the image block in the video, combining motion vectors of image blocks corresponding to the image block in previous frames of images in the video, to obtain a temporal visual saliency of the image block.

Preferably, in the method for detecting visual saliencies of a video image based on spatial and temporal features, calculating a motion vector of the image block in the video, including:

in a previous frame image of the current image, searching out an image block which has a least matching error with respect to the image block, and taking a horizontal displacement and a vertical displacement of the image block between the two image blocks as the motion vector of the image block of the current image.

Preferably, in the method for detecting visual saliencies of a video image based on spatial and temporal features, obtaining a temporal visual saliency of the image block includes:

combining a horizontal displacement and a vertical displacement of the motion vector of the image block of the current image into a component V(t); and an average of components of corresponding image blocks in previous frames of images is subtracted from the component V(t), to obtain the temporal visual saliency of the image block in the current image.

Preferably, in the method for detecting visual saliencies of a video image based on spatial and temporal features, in the step 5), constituting a two-dimension spatial feature saliency map of the current image includes: performing a central bias operation on the two-dimension spatial feature saliency map according to average attention weights of human eyes.

Preferably, in the method for detecting visual saliencies of a video image based on spatial and temporal feature, the previous frames of images are previous 3 frames of images.

Preferably, in the method for detecting visual saliencies of a video image based on spatial and temporal features, in the step 1), if the current image is a square figure, the current image is divided into L non-overlapping square image blocks; and if the current image is a non-square figure, the current image is stretched into a square figure.

Preferably, in the method for detecting visual saliencies of a video image based on spatial and temporal features, in the step 5), calculating a spatial visual saliency of each image block in the current image with decreased dimensions, includes: calculating a dissimilarity between the image block and each of the other image blocks in the current image, and determining the spatial visual saliency of the image block according to an Euclidean distance between the image block and each of the other image blocks.

Another object of the present invention is to provide a method for detecting visual saliencies of a video image based on spatial and temporal features, including the following steps:

1) acquiring a plurality of frames of images of the video with a predetermined time interval, selecting a current image from the frames of images, dividing the current image into L non-overlapping square image blocks, each of the image blocks containing $K^2$ pixels;

2) vectorizing each pixel in each of the image blocks into a column vector, each value in the column vectors being one of a R value, a G value and a B value of a RGB value of the pixel such that the column vector has a length of $3K^2$ values;

3) jointing column vectors of all image blocks in a row direction, to form a value matrix of the current image which has $3K^2$ rows and L columns;

4) performing a dimension decreasing operation on the value matrix of the current image by utilizing a principal component analysis algorithm;

5) calculating a spatial visual saliency of each image block in the current image with decreased dimensions, adding the spatial visual saliency to a position corresponding a position of the image block in the current image, to constitute a two-dimension spatial feature saliency map of the current image;

6) calculating a temporal saliency of each image block in the current image with decreased dimensions according to a block matching method, adding the temporal visual saliency to a position corresponding a position of the image block in the current image, to constitute a two-dimension temporal feature saliency map of the current image; and 7) integrating the two-dimension spatial feature saliency map and the two-dimension temporal feature saliency map, to obtain a spatiotemporal feature saliency map.

The present invention has advantageous effects as follows:

1. in the present invention, based on an acquired spatial feature saliency map, a temporal feature saliency map is obtained by extracting motion features between image blocks, and a spatiotemporal feature saliency map is obtained by integrating the spatial feature saliency map and the temporal feature saliency map, so saliencies in different regions of the video may be predicted more accurately; and 2. compared with other conventional methods, this invention has no need to extract color, orientation, texture and other visual features, which eliminates the step of feature selection.

DETAILED DESCRIPTION

Hereinafter, the present invention is further described in detail in conjunction with accompany drawings, to enable those skilled in the art to practice the invention with reference to the contents of the description.

Figure 1:
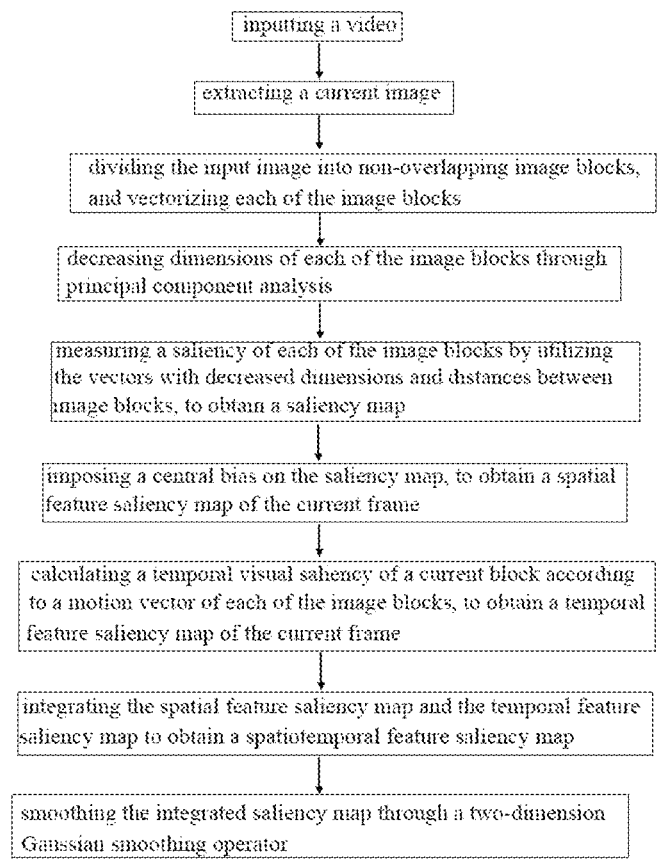
FIG. 1 is a flow chart showing a method for detecting visual saliencies of a video image based on spatial and temporal features according to the present invention.

A method for detecting visual saliencies of a video image based on spatial and temporal features is disclosed by the present invention. As shown in FIG. 1, the method includes at least the following steps.

In step 1, an input image is divided into image blocks and vectorized.

It is assumed that the input video frame is a 3-channel colorful image I, and has a width W and a height H.

In step 1.1, the image I is divided into L non-overlapping image blocks pi, i=1, 2, ..., L, in an order from left to right and from top to bottom, and each of the image blocks is a square block with a width k and a height k, k<W, k<H. Each of the image blocks has $k^2$ pixels, and the image I may be divided into totally L=(W/k)·(H/k) image blocks. In case where a width or a height of an image is not integer multiples of k, the image is scaled to make the width or the height of the image is integer multiples of k.

In step 1.2, each pixel of each of the image blocks pi is vectorized into a column vector fi with a length of $3K^2$ values.

Any one of the image blocks pi is a 3-channel colorful image. That is, each pixel of the image blocks pi is represented by a combination such as (R, G, B). Each value in the column vector is a R value, a G value and a B value of a RGB value of the pixel.

Each pixel in each of the image blocks pi is vectorized into a column vector fi means that, firstly, a R matrix is extracted and transformed into a R column vector with a length of $K^2$ values; then, a G matrix is extracted and transformed into a G column vector with a length of $K^2$ values, the G column vector being arranged behind the R column vector; and finally, a B matrix is extracted and transformed into a B column vector with a length of $K^2$ values, the B matrix being arranged behind the G column vector to obtain a final column vector fi with a length of $3K^2$ values.

In step 2, all the vectors obtained from step 1 are decreased in dimensions through principal component analysis.

In step 2.1, an average vector $\bar{f}$ of all the vectors obtained from step 1 is calculated:

$$\bar{f} = \sum_{i=1}^{L} f_i \quad (1)$$

In step 2.2, all the image blocks are numbered in the current image from left to right and from top to bottom, and the column vectors are jointed in a row direction according to an order of the numbers, to form a value matrix of the current image which has $3K^2$ rows and L columns; and a sample matrix A is constituted based on the value matrix of the current image:

$$A=[(f_1-\bar{f}),(f_2-\bar{f}),\ldots,(f_N-\bar{f})] \quad (2)$$

In step 2.3, a scatter matrix of the sample matrix A is calculated:

$$G = \frac{(1)}{(L^2)} \cdot (A^T A) \quad (3)$$

where G is a L×L scatter matrix.

In step 2.4, eigenvalues and eigenvectors of the scatter matrix G are calculated, and $X_1, X_2, \ldots, X_d$ corresponding to d largest eigenvalues are selected to constitute a matrix U:

$$U=[X_1 X_2 \ldots X_d]^T \quad (4)$$

where U is a D×L matrix.

In step 3, a dissimilarity between each of the image blocks and each of the other image blocks is calculated by utilizing the vectors with decreased dimensions obtained from step 2; and a visual saliency of each of the image blocks is calculated with reference to distances between the image blocks, to obtain a spatial feature saliency map.

In step 3.1, a visual saliency of each of the image blocks pi is calculated:

$$Sal_i = \sum_{i=1}^{L} \frac{\varphi_{ij}/M_i}{1+\omega_{ij}/D} \quad (5)$$

$$M_i = \max_j \{\omega_{ij}\}(j=1,\ldots,L) \quad (6)$$

$$D = \max\{W, H\} \quad (7)$$

$$\varphi_{ij} = \sum_{s=1}^{d} |u_{si} - u_{sj}| \quad (8)$$

$$\omega_{ij} = \sqrt{(x_{pi}-x_{pj})^2 + (y_{pi}-y_{pj})^2} \quad (9)$$

where $\phi_{ij}$ represents a dissimilarity between image blocks pi and pj, $\omega_{ij}$ represents a distance between image blocks pi and pj, $u_{mn}$ represents an element at $m^{th}$ row and $n^{th}$ column of the matrix U, and $(x_{pi}, y_{pi})$, $(x_{pj}, y_{pj})$ respectively represent central ordinates of image blocks pi and pj on the original image I.

In step 3.2, values taken by visual saliencies of all the image blocks are organized into a two-dimension form according to the positions of the image blocks on the original image I, to constitute a spatial feature saliency map SalMap.

The spatial feature saliency map SalMap is a gray scale map with J rows and N columns, J=H/k, N=W/k. An element at $i^{th}$ row and $j^{th}$ column of the spatial feature saliency map SalMap corresponds to a saliency of an image block $p_{(i-1)\cdot N+j}$ obtained from the divided original image I.

$$SalMap(i,j)=Sal_{(i-1)\cdot N+j} \ (i=1,\ldots,J, j=1,\ldots,N) \quad (10)$$

In step 4, a central bias is imposed on the spatial feature saliency map obtained from step 3, to obtain a spatial feature saliency map after central bias.

In step 4.1, a distance map DistMap and a human eye average attention weight map AttWeiMap are generated.

A calculation formula for the distance map DistMap is:

$$DistMap(i, j) = \sqrt{(i-(J+1)/2)^2 + (j-(N+1)/2)^2} \quad (11)$$
$$(i=1,\ldots,J, j=1,\ldots,N)$$

A calculation formula for the human eye average attention weight map AttWeiMap is:

$$AttWeiMap(i, j) = 1 - \frac{DisMap(i, j) - \min\{DistMap\}}{\max\{DistMap\} - \min\{DistMap\}} \quad (12)$$
$$(i=1,\ldots,J, j=1,\ldots,N)$$

where each of the distance map DistMap and the human eye average attention weight map AttWeiMap has a same size with the spatial feature saliency map SalMap.

In step 4.2, a Hadamard product of the spatial feature saliency map and the spatial feature saliency map is calculated, to obtain a spatial feature saliency map SalMap' after central bias, and the calculation formula is:

$$SalMap'(i,j) = SalMap(i,j) \cdot AttWeiMap(i,j)$$
$$(i=1,\ldots,J, j=1,\ldots,N) \quad (13)$$

In step 5, a motion vector of each of the image blocks is calculated according to a "block matching" method. A temporal visual saliency of a current image block is extracted based on motion vectors of previous two frames, and the temporal visual saliency is added to a corresponding position of the image block in the current image, thereby to constitute a two dimension temporal feature saliency map of the current image.

In step 5.1, a motion vector of a current image block is calculated according to a "block matching" method.

an image block is searched out from a previous frame which has a least matching error according to a "three-step search method", and the least matching error is:

$$MSE = \Sigma |f_{t-1}(x+V_x(t), y+V_y(t)) - f_t(x,y)| \quad (14)$$

where, MSE is a least matching error, $f_{t-1}$, $f_t$ respectively represents a previous frame and a current frame, t is a serial number of a frame, x, y are a horizontal position and a vertical position of a current block, $f_t(x, y)$ is a three-channel RGB matrix corresponding to an image block at a position (x, y) of a current frame, and $V_x(t)$, $V_y(t)$ are a horizontal displacement and a vertical displacement of the image block in the previous frame which has the least matching error, to constitute a motion vector $(V_x(t), V_y(t))$ of the current block.

In step 5.2, a temporal feature saliency map is generated.

(1) the horizontal displacement and the vertical displacement of the motion vector of the current block are combined into a component V(t):

$$V(t) = \sqrt{V_x(t)^2 + V_y(t)^2} \quad (15)$$

(2) an average of components of three image blocks at the corresponding position of three previous frames is subtracted from a component V(t) of the current block, to obtain a temporal visual saliency of the current block; for image blocks in first three frames of a video, an average of components of the image blocks at the corresponding position of all the previous frames is subtracted from a component V(t) of the current block, to obtain a temporal feature saliency map. The calculation formula is:

$$SV(i, j, t) = \begin{cases} \left(V_{i,j}(t) - \left(\sum_{k=0}^{t-1} V_{i,j}(k)\right)\right) / 3, \text{ if } 0 < t \leq 3 \\ \left(V_{i,j}(t) - \left(\sum_{k=t-3}^{t-1} V_{i,j}(k)\right)\right) / 3, \text{ if } t > 3 \end{cases} \quad (16)$$

Figure 2:
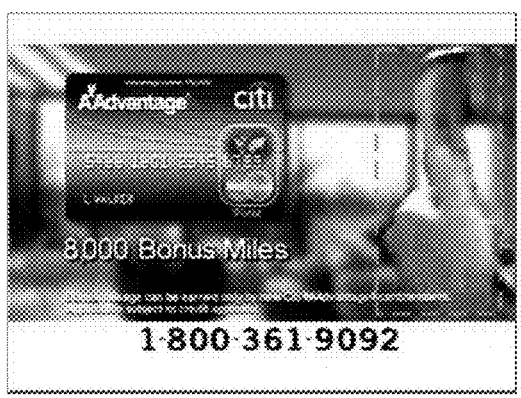
FIG. 2 shows a temporal feature saliency map through a method for detecting visual saliencies of a video image based on spatial and temporal features according to the present invention, in which (a) is an original image, and (b) is a temporal feature saliency map of the original image.
Figure 2:
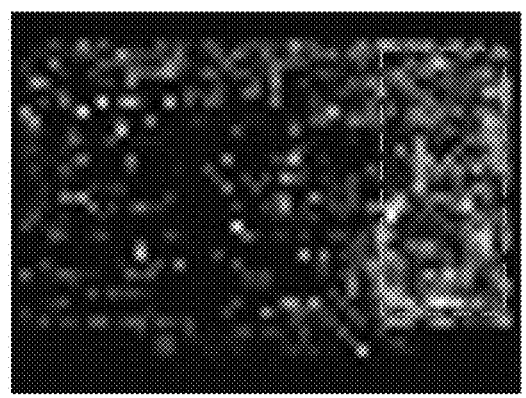

As shown in FIG. 2, (a) is an original image, and (b) is a temporal feature saliency map of the original image.

In step 6, step 4 and step 5 are integrated to obtain two saliency maps, i.e. a spatiotemporal feature saliency map. The spatiotemporal feature saliency map is smoothed by a two-dimension Gaussian smoothing operator, to obtain a resulted image finally reflecting a saliency of each region on the image. The calculation formula is:

$$Saliency(i,j,t) = NOR[SalMap'(i,j)] + \alpha \Box NOR[(SalMap'(i,j)) \Box SV(i,j,t)^\beta] \quad (17)$$

where NOR($\Box$) is a normalized operating operator, $\alpha$, $\beta$ are constants, and in the present invention, $\alpha=0.2$, $\beta=3$.

Regions with larger values on the resulted image finally obtained are more salient.

So far, calculation of a visual saliency of each region in an input video has been implemented. Based on this, the resulted image may be further processed depending on specific applications. For example, the resulted image finally obtained is enlarged to a same size with the originally input image, or is converted into a two-value image through a set threshold.

In order to test detection effects of the present invention on visual saliency of each region in a video, the method of the present invention and a conventional method in the art are applied to a video dataset disclosed by Itti et al for detection. There are totally 100 video clips in the video dataset which may be divided into three sub-testing dataset depending on whether there is a motion target or switching of scenes, respectively ORIG-M, ORIG-N and MTV. Among them, each of the totally 30 videos contained in the sub-testing dataset ORIG-M contains a single scene with a motion target, each of the totally 20 videos contained in the sub-testing dataset ORIG-N contains a single scene with no motion target, and each of the totally 50 videos contained in the sub-testing dataset MTV contains multiple scenes. Topics of the video dataset convers outdoor sports, video games, sports and television news. An average length of each video is about 15 seconds, and a total length of all the videos is 25 minutes. For each video, real fixations of human eyes recorded by a gaze tracker are provided which are fixations of each subject on each frame of the videos. There are totally 7 subjects participated the fixation acquisition experiment, and each video clip is only viewed by some of the 7 subjects.

The method of the present invention and other saliency detection method are respectively performed on the testing video dataset, to obtain an image corresponding to each frame of each video in the video dataset which reflects saliencies of all the regions on the image. A detection program for video saliencies disclosed by Itti et al is applied, effectiveness of several methods are evaluated by measuring a Kullback-Leibler distance (hereinafter referred to as KL distance) between a saliency distribution around a real human eye fixations and a saliency distribution of randomly selected regions, and a larger KL distance denotes that the algorithm may more effectively distinguish a fixation and a randomly selected region.

The method of the present invention is compared with the following conventional methods in the art:

1. Itti'98, a method based on a feature combination theory, proposed by Itti, a member of American Itti laboratory;
2. Itti'05, a method based on a concept of 'visual surprise', proposed by Itti, a member of American Itti laboratory;
3. SR, a method based on amplitude spectral residual, proposed by Hou Xiaodi, California Institute of Technology, US;
4. PQFT'09, a method based on phase spectral residual, presented by Guo Chenlei, FuDan University of China;
5. SWD, a detection method proposed by the invention application NO. 201010522415.7, Beijing University of Technology.

Test results of KL distances show that, on the sub-test datasets ORIG-M and MTV, the performance of the method of the present invention is better than those of the above 5 methods, and on the sub-test dataset ORIG-N, the performance of the method of the present invention is essentially equivalent to that of the method SWD, and better than those of the other 4 methods, as shown in Table 1.

TABLE 1

KL values of different methods on the testing video dataset

|  | Itti'98 | Itti'05 | SR | PQFT | SWD | THE PRESENT INVENTION |
| --- | --- | --- | --- | --- | --- | --- |
| ORIG-M | 0.0857 | 0.1574 | 0.2386 | 0.2436 | 0.6110 | 0.6642 |
| ORIG-N | 0.0151 | 0.0455 | 0.2312 | 0.2241 | 0.4165 | 0.4123 |
| MTV | 0.0307 | 0.0736 | 0.1847 | 0.1881 | 0.5670 | 0.5699 |

Although the embodiments of the present invention have been disclosed as above, they are not limited merely to those set forth in the description and the embodiments, and they may be applied to various fields suitable for the present invention. For those skilled in the art, other modifications may be easily achieved, and the present invention is not limited to the particular details and illustrations shown and described herein, without departing from the general concept defined by the claims and their equivalents.

What is claimed is:

1. A method for detecting visual saliencies of a video image based on spatial and temporal features, characterized in that, the method comprises the following steps:
   1) selecting a current image from a video, dividing the current image into L non-overlapping square image blocks, each of the image blocks containing $K^2$ pixels;
   2) vectorizing each pixel in each of the image blocks into a column vector, each value in the column vectors being a R value, a G value and a B value of a RGB value of the pixel such that the column vector has a length of $3K^2$ values;
   3) jointing column vectors of all image blocks in a row direction, to form a value matrix of the current image which has $3K^2$ rows and L columns;
   4) performing a dimension decreasing operation on the value matrix of the current image by utilizing a principal component analysis algorithm;
   5) calculating a spatial visual saliency of each image block in the current image with decreased dimensions, adding the spatial visual saliency to a position corresponding a position of the image block in the current image, to constitute a two-dimension spatial feature saliency map of the current image;
   6) calculating a temporal saliency of each image block in the current image with decreased dimensions according to a block matching method, adding the temporal visual saliency to a position corresponding a position of the image block in the current image, to constitute a two-dimension temporal feature saliency map of the current image; and
   7) integrating the two-dimension spatial feature saliency map and the two-dimension temporal feature saliency map, to obtain a spatiotemporal feature saliency map.

2. The method for detecting visual saliencies of a video image based on spatial and temporal features of claim 1, characterized in that,
   the step 7) further comprises: performing a smoothing operation on the spatiotemporal feature saliency map through a two-dimension Gaussian smoothing operator, to obtain a resulted image finally reflecting a saliency of each region on the current image.

3. The method for detecting visual saliencies of a video image based on spatial and temporal features of claim 1, characterized in that, a plurality of frames of images of the video is acquired at equal time intervals, and the current image is one of the frames of images.

4. The method for detecting visual saliencies of a video image based on spatial and temporal features of claim 3, characterized in that,
   in the step 6), calculating a temporal saliency of each image block in the current image with decreased dimensions according to a block matching method comprises: firstly, calculating a motion vector of the image block in the video, combining motion vectors of image blocks corresponding to the image block in previous frames of images in the video, to obtain a temporal visual saliency of the image block.

5. The method for detecting visual saliencies of a video image based on spatial and temporal features of claim 4, characterized in that,
   calculating a motion vector of the image block in the video, comprising:
   in a previous frame image of the current image, searching out an image block which has a least matching error with respect to the image block, and taking a horizontal displacement and a vertical displacement of the image block between the two image blocks as the motion vector of the image block of the current image.

6. The method for detecting visual saliencies of a video image based on spatial and temporal features of claim 5, characterized in that,
   obtaining a temporal visual saliency of the image block comprises:
   combining a horizontal displacement and a vertical displacement of the motion vector of the image block of the current image into a component V(t); and
   an average of components of corresponding image blocks in previous frames of images is subtracted from the component V(t), to obtain the temporal visual saliency of the image block in the current image.

7. The method for detecting visual saliencies of a video image based on spatial and temporal features of claim 6, characterized in that, the previous frames of images are previous 3 frames of images.

8. The method for detecting visual saliencies of a video image based on spatial and temporal features of claim 1, characterized in that, in the step 5), constituting a two-dimension spatial feature saliency map of the current image comprises: performing a central bias operation on the two-dimension spatial feature saliency map according to average attention weights of human eyes.

9. The method for detecting visual saliencies of a video image based on spatial and temporal features of claim 1, characterized in that, in the step 1), if the current image is a square figure, the current image is divided into L non-overlapping square image blocks; and if the current image is a non-square figure, the current image is stretched into a square figure.

10. The method for detecting visual saliencies of a video image based on spatial and temporal features of claim 1, characterized in that, in the step 5), calculating a spatial visual saliency of each image block in the current image with decreased dimensions, comprises: calculating a dissimilarity between the image block and each of the other image blocks in the current image, and determining the spatial visual saliency of the image block according to an Euclidean distance between the image block and each of the other image blocks.

11. A method for detecting visual saliencies of a video image based on spatial and temporal features, characterized in that, the method comprises the following steps:

1) acquiring a plurality of frames of images of the video with a predetermined time interval, selecting a current image from the frames of images, dividing the current image into L non-overlapping square image blocks, each of the image blocks containing $K^2$ pixels;

2) vectorizing each pixel in each of the image blocks into a column vector, each value in the column vectors being one of a R value, a G value and a B value of a RGB value of the pixel such that the column vector has a length of $3K^2$ values;

3) jointing column vectors of all image blocks in a row direction, to form a value matrix of the current image which has $3K^2$ rows and L columns;

4) performing a dimension decreasing operation on the value matrix of the current image by utilizing a principal component analysis algorithm;

5) calculating a spatial visual saliency of each image block in the current image with decreased dimensions, adding the spatial visual saliency to a position corresponding a position of the image block in the current image, to constitute a two-dimension spatial feature saliency map of the current image;

6) calculating a temporal saliency of each image block in the current image with decreased dimensions according to a block matching method, adding the temporal visual saliency to a position corresponding a position of the image block in the current image, to constitute a two-dimension temporal feature saliency map of the current image; and 7) integrating the two-dimension spatial feature saliency map and the two-dimension temporal feature saliency map, to obtain a spatiotemporal feature saliency map.

\* \* \* \* \*